(12) United States Patent
Adams

(10) Patent No.: US 7,646,864 B2
(45) Date of Patent: Jan. 12, 2010

(54) FOOT-ACTUATED CALL ANSWER-END APPARATUS

(75) Inventor: Susan Adams, Santa Cruz, CA (US)

(73) Assignee: Plantronics, Inc., Santa Cruz, CA (US)

(*) Notice: Subject to any disclaimer, the term of this patent is extended or adjusted under 35 U.S.C. 154(b) by 415 days.

(21) Appl. No.: 11/712,061

(22) Filed: Feb. 28, 2007

(65) Prior Publication Data

US 2008/0285742 A1    Nov. 20, 2008

(51) Int. Cl.
  *H04M 1/00*    (2006.01)
  *H04M 9/00*    (2006.01)
  *H04R 25/00*   (2006.01)

(52) U.S. Cl. ................................. 379/430; 381/370

(58) Field of Classification Search .............. 379/430; 381/330, 370, 374–376, 379, 383; 455/575.1, 455/575.2
See application file for complete search history.

(56) References Cited

U.S. PATENT DOCUMENTS

2004/0204168 A1*  10/2004  Laurila ................... 455/569.1
2008/0080705 A1*  4/2008   Gerhardt et al. ............. 379/430

* cited by examiner

*Primary Examiner*—Tuan D Nguyen
(74) *Attorney, Agent, or Firm*—Richard M. Goldman; Andre Tacdiran

(57) ABSTRACT

A telephone headset system having a network interface device, a head set including a headphone and a microphone, and a foot operated, hands free call answering and call ending element. The network interface device, headset, and call answering and call ending element are electronically in communication with each other.

18 Claims, 5 Drawing Sheets

FOOT-ACTUATED CALL ANSWER-END APPARATUS

BACKGROUND OF THE INVENTION

1. Field of the Invention

The invention relates to hands free headsets for home telephone systems, offices, and small businesses, such as hair/nail salons

2. Background Art

Headset users who are at home, at work, or in other places often have their hands busy when the phone rings. For example, users may be working with both hands in the kitchen, in the office, in a hair and nail salon, at a computer terminal or a CAD-CAM work station. Alternatively, the user in question might be a handicapped individual with a partial or complete immobility of the hands. As a result, when the phone rings, it may be very inconvenient for the user to stop their then current manual activity to push a button located on the headset or remote dial pad to answer the call, or to end the call.

Handset lifters are used in the office for remotely answering telephones. In one example of a lifter device, an arm or paddle slightly lifts the handset off the telephone cradle, to a position that allows the hook switch of the telephone to attain the off-hook position. This action is in response to an electrical signal to a motor or solenoid driving the arm. The electrical signal is in response to a button-push at the lifter or some remote device. Automatic call answering can be set on a cell phone or in a telemarketing or call center situation, but then the user can not screen out unwanted calls, like telemarketers. In addition, home automatic call answering does not have an infrastructure or market acceptance.

Thus, a need exists for a totally hands free solution for answering and ending calls, combining a hands free headset and a hands free call answering and call ending element.

SUMMARY OF THE INVENTION

According to the invention described herein, we provide a totally hands free solution, combining a hands free headset and a foot operated, hands free call answering and call ending element. Described herein is a telephone headset system having a network interface device, a headset including a headphone and a microphone, and a foot operated, hands free call answering and call ending element, and optionally with augmented capabilities, such as redial, #, *, call-waiting, and flash capabilities. The network interface device, headset, and call answering and call ending element are all electronically in communication with each other. The electronic communication may be by hard wire, by wireless (including low power, gigahertz frequency signals, optionally with spread spectrum modulation in "noisy" environments), or by infra-red with suitable transducers.

FIGURES

The apparatus of our invention is illustrated in the attached figures.

DESCRIPTION OF THE INVENTION

A hands free headset solution, combining a hands free headset and a foot operated, hands free call answering and call ending element is shown in the figures. The system of the invention includes an interface to the Public Switch Telephone Network (PSTN) or Voice Over Internal Protocol (VOIP) network, a hands free headset which includes earphone(s) and a microphone, and a remotely actuated hands free call answering and call ending element, as a foot operated, hands free call answering and call ending element, a knee actuated hands free call answering and call ending element, or an elbow actuated hands free call answering and call ending element. Connectivity between the PSTN or VOIP interface and either or both of the head set and the call answering/call ending element may be wireless or hardwired, and if wireless may be optical or electronic.

Figure 1:
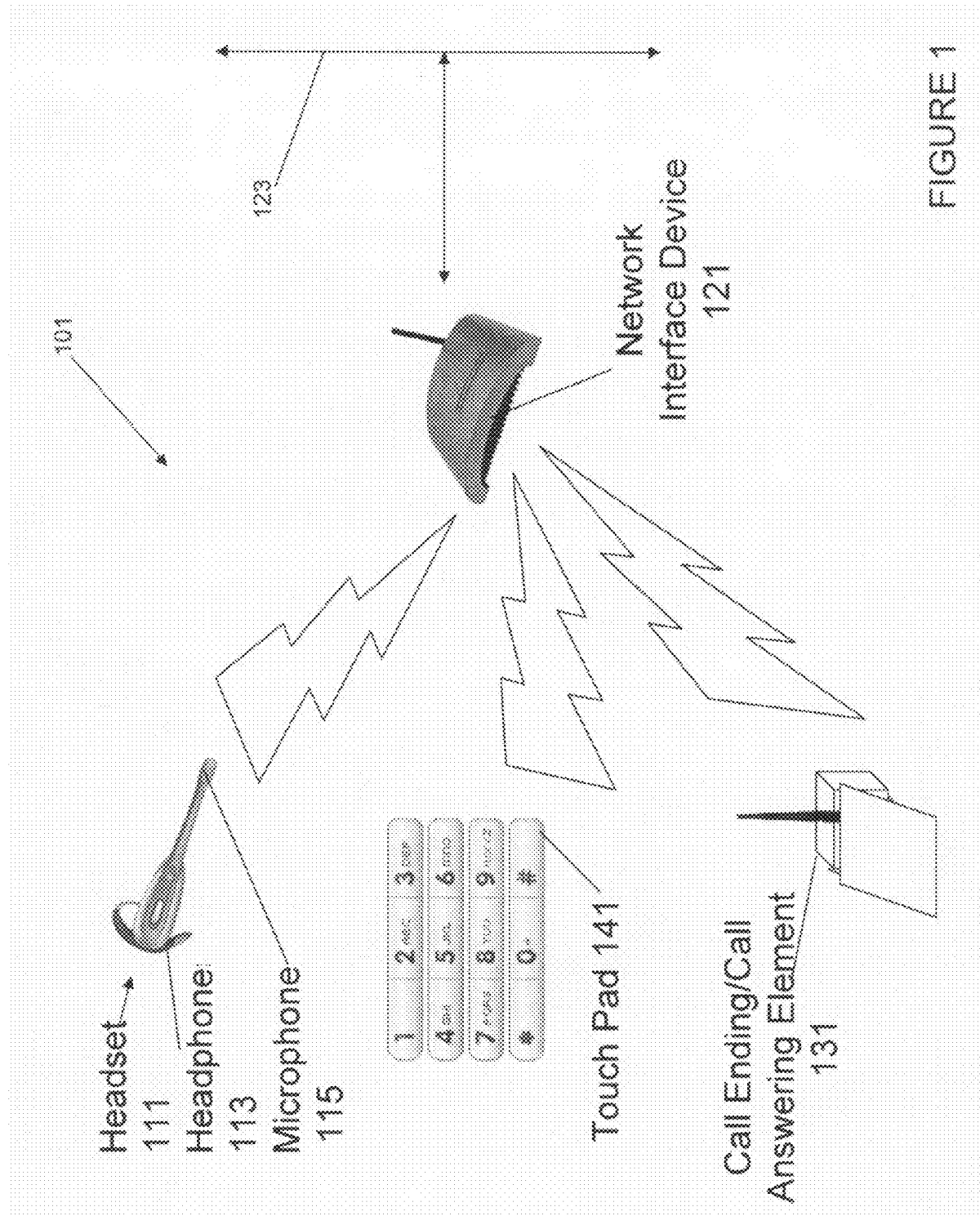
FIG. 1 illustrates a high level schematic diagram of a telephone headset system having a network interface device, a head set including a headphone and a microphone, and a foot operated, hands free call answering and call ending element. The network interface device, headset, and call answering and call ending element are electronically in communication with each other.

As shown in the figures, as FIG. 1, the system 101 comprises a network interface device 121, a headset 111 including a headphone 113 and a microphone 115, and a foot operated, hands free call answering and call ending element 131. The network interface device 121, the headset 111, and the call answering and call ending element 131 are electronically in communication. In one embodiment the network interface device 121 is in wireless electronic communication with at least one of the headset 111, the call answering and call ending element 131, and a key touchpad 141 if present. In a preferred exemplification the network interface device 121 is in wireless electronic communication with both of the headset 111, and call answering and call ending element 131.

The network interface device 121 connects to a telecommunications network 123, which may be a PSTN network or a VOIP network.

The call answering/call ending element 131 is a remote control, as a foot-actuated, knee actuated, or elbow actuated control to answer and/or end telephone calls.

Figure 2:
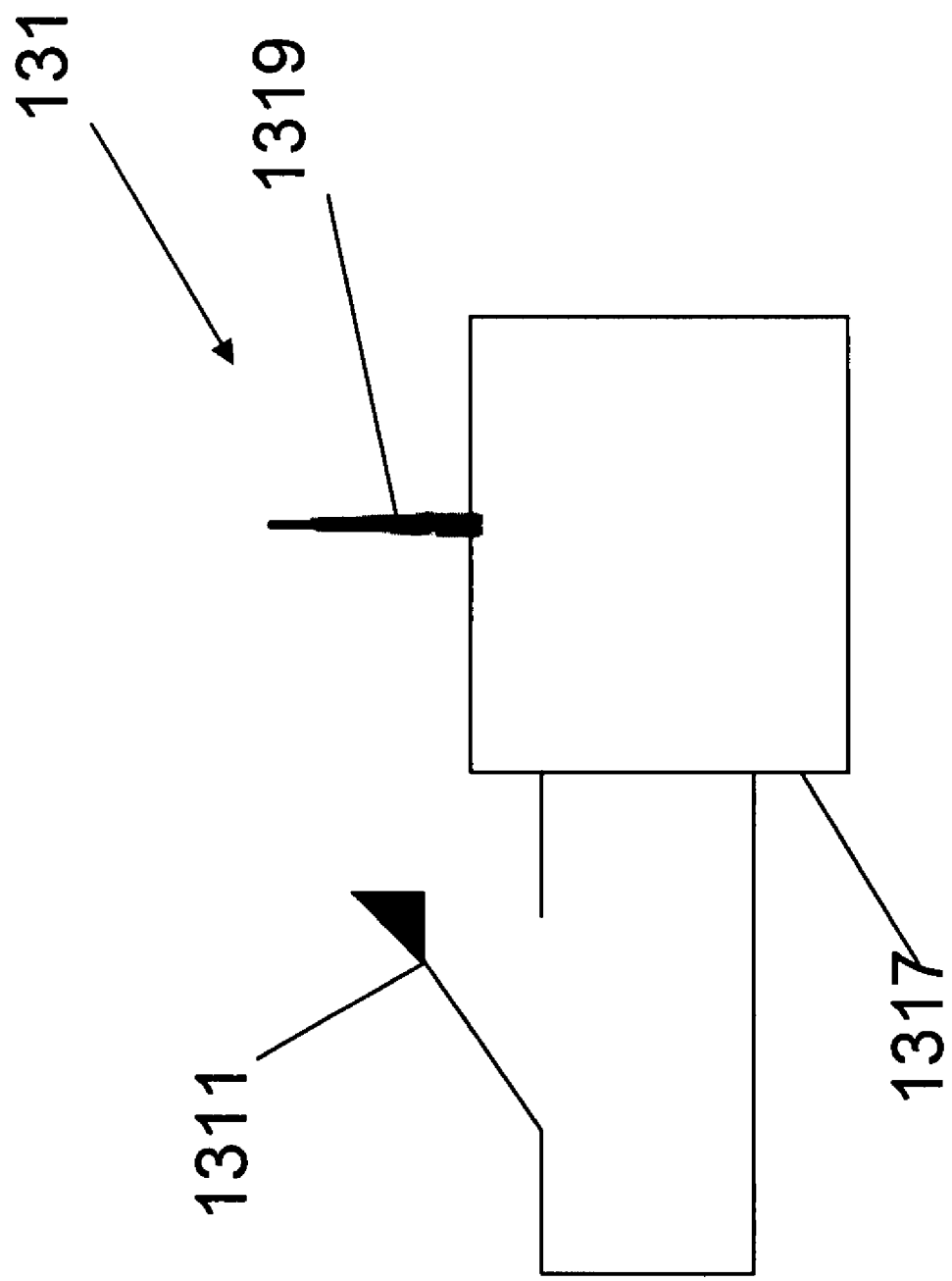
FIG. 2 is a high level schematic diagram of a call answering and call ending element.

FIG. 2 is a high level schematic diagram of a call answering and call ending element 131, which encompasses the remote actuated hands free call answering and call ending element 131, as a foot operated, hands free call answering and call ending element, a knee actuated hands free call answering and call ending element, or an elbow actuated hands free call answering and call ending element. The remote actuated hands free call answering and call ending element 131 includes, generally, a switch 1311, which may be all solid state, or electromechanical. The call ending element 131 also includes internal circuitry represented by switch 1317 and a transducer as antenna 1319 for radio frequency signals.

Figure 3:
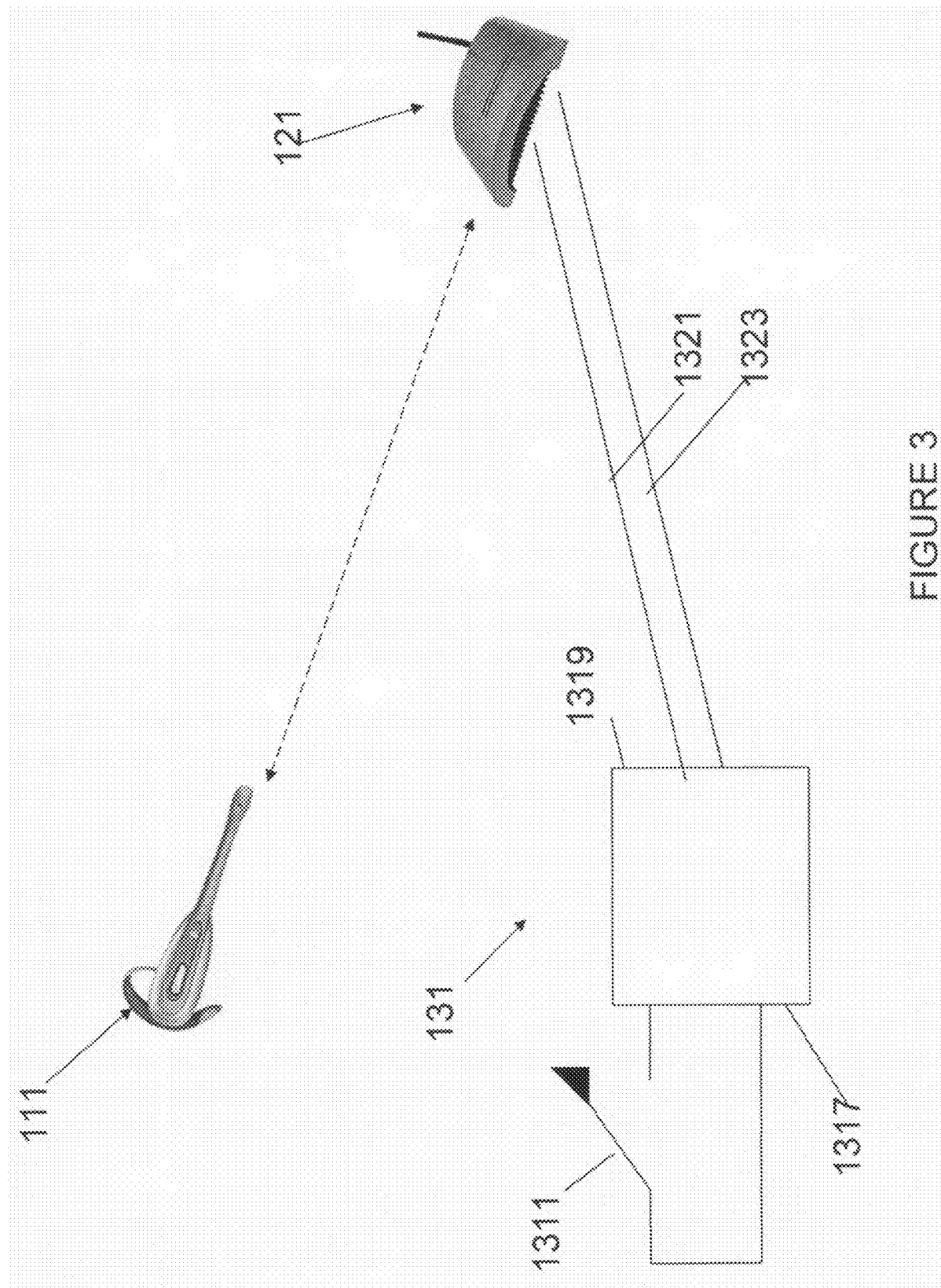
FIG. 3 illustrates a high level schematic view of a hard wired implementation of the invention.

FIG. 3 illustrates a high level schematic view of the head set 111, call answering and ending element 131, and a network interface device 121 in a hard wired implementation of my invention. The remote actuated hands free call answering and call ending element 131 includes, generally, a switch 1311, which may be all solid state, or electromechanical. The call ending element 131 also includes internal circuitry represented by switch 1317 and conductors, as conductors 1321 and 1323, for the + and − signals, connected to the network interface device 121 for integration with the headset 111.

Figure 4:
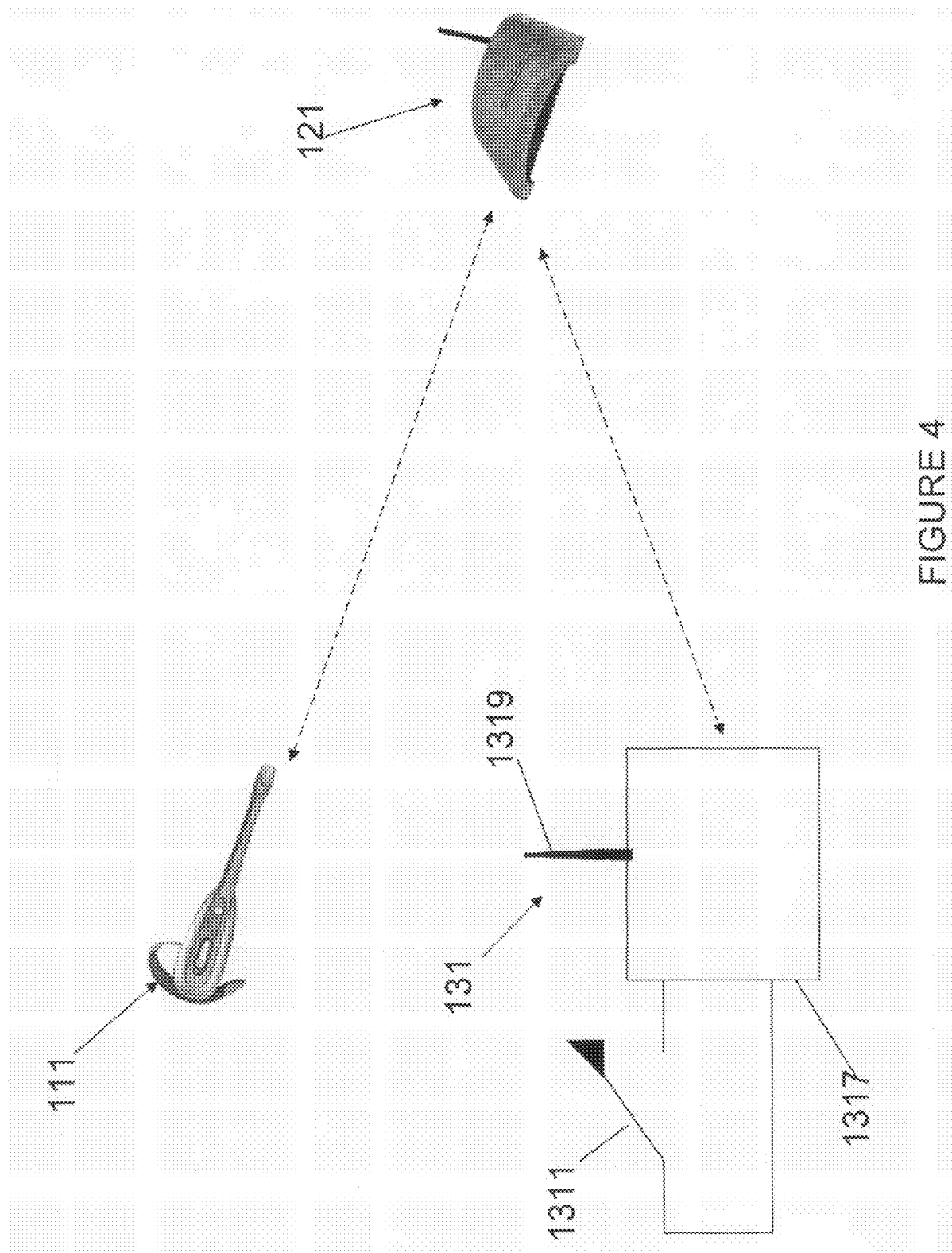
FIG. 4 illustrates a high level schematic view of a wireless implementation of the invention.

FIG. 4 is a high level schematic view of a wireless implementation of the invention with a head set 111, call answering and ending element 131, and a network interface device 121. The remote actuated hands free call answering and call ending element 131 includes, generally, a switch 1311, which may control a transistor. The call ending element 131 also includes internal circuitry represented by switch 1317 and a transducer, as antenna 1319 for wireless connection to the network interface device 121 for integration with the headset 111.

The remote call answering and ending element 131, as the foot control, may be conveniently placed in a desk leg well or in a stowaway compartment in a kitchen wall so that the user can "kick" it open or closed, depending on whether it is in use.

The call answering and ending unit may also be a wireless system, as a Bluetooth system, to enable portability, for example from room to room, or cubicle to cubicle, within range of the network interface device 121. A wireless call answering and ending unit 131 would typically have a unique "signature." This signature could be a sequence of 0's and 1's, or, in a spread spectrum or Bluetooth implementation, a unique frequency pattern.

Figure 5:
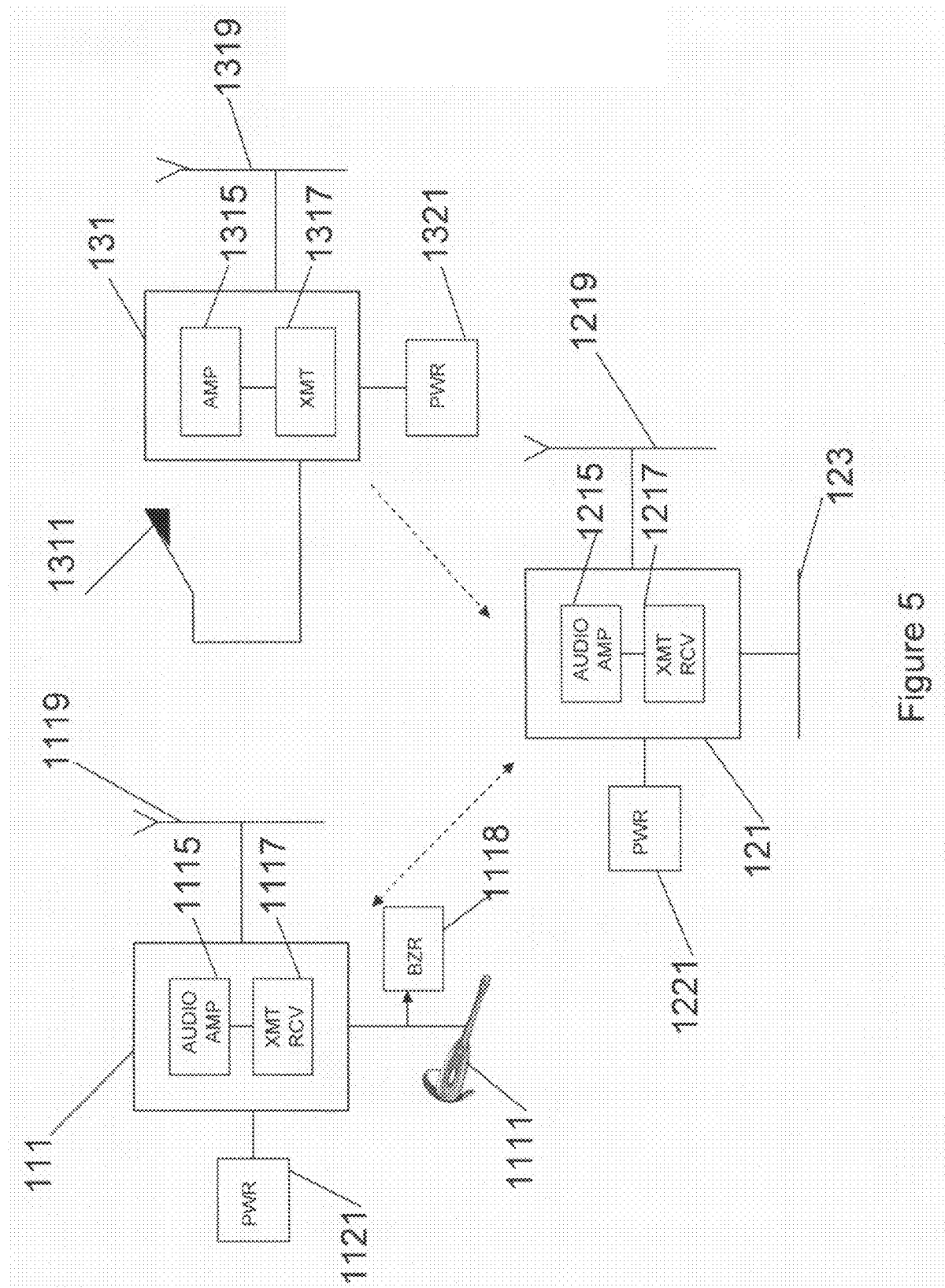
FIG. 5 illustrates a detailed schematic view of a wireless implementation of the invention.

In the exemplification of FIGS. 1, 4, and 5 the hands free call answering and ending element 131 communicates with network interface device 121 by transmitting a wireless, electromagnetic signal. This wireless, electromagnetic signal may be a radio signal, for example a radio signal with a frequency offset from the system carrier signal or from the voice signal, to avoid interference with, or contamination of the system carrier signal. For example, where the system carrier signal is a 900 megahertz signal, the call answering and ending signal may be an 840 megahertz signal or an 870 megahertz signal, or a 930 megahertz signal, or a 960 megahertz signal. The signal itself may include a multi digit code, either encrypted or plain, and unique to the network interface device. This has the advantage of avoiding the electromechanical complexity of a cradle lifter device.

FIG. 5 illustrates a system level schematic diagram of an integrated system of the invention with a network interface device 121, a headset 111, and the hands free call answering and ending element 131, and an optional keypad (not illustrated). The network interface device 121 is connected to a network 123 through a phone line interface. The network interface device 121 includes power components 1221 and radio components. The radio components include an audio amplifier 1215 and a transmitter/receiver 1213, and an antenna 1219 for communication with the headset 111 and the hands free call answering and ending element 131.

FIG. 5 further illustrates the headset 111 including the radio components, such as an audio amplifier 1115 and a transmitter/receiver 1113, a ringer/buzzer 1118 to indicate an incoming call, an antenna 1119, a battery 1121, and the headset 1111 including a microphone and a speaker, where typically the speaker is an earpiece.

FIG. 5 also illustrates the hands free call answering and ending element 131 communicating with the network interface device 121 by transmitting an wireless, electromagnetic signal. The hands free call answering and ending element 131 includes an amplifier 1315, a transmitter 137, and an antenna 1319 for communicating with the network interface device 121 by transmitting the wireless, electromagnetic signal to the network interface device 121, with the antenna 1319 for carrying signals from the hands free call answering and ending element 131 to the network interface device 121, and a battery 1321.

The totally hands free system described herein makes it much more convenient for a user, who is otherwise occupied, to answer and end calls. A further advantage is that missed calls, that go over to voice mail, are reduced because it is not necessary to "break rhythm" to put down work and pick up a hand set or keypad.

While the invention has been described and illustrated with respect to certain preferred embodiments and exemplifications, it is not intended to limit the scope of the invention thereby, but solely by the claims appended hereto.

I claim:

1. A telephone headset system comprising:
 a) a network interface device;
 b) a headset including a headphone and a microphone; and
 c) a remote, hands free call answering and call ending element comprising a foot switch actuator;
 said network interface device, headset, and call answering and call ending element being electronically in communication.

2. The telephone headset system of claim 1 wherein said network interface device, said head set, and said remote call answering and call ending device are electrically in contact.

3. The telephone headset system of claim 1 wherein said network interface device is in wireless electronic communication at least one of said headset, and said remote call answering and call ending element.

4. The telephone headset system of claim 3 wherein said network interface device is in wireless electronic communication with both of said headset, and said remote call answering and call ending element.

5. The telephone headset system of claim 4 wherein said remote call answering and call ending element is in wireless connection with the network interface device through an encoded signal.

6. The telephone headset system of claim 5 wherein said remote call answering and call ending element is in wireless connection with the network interface device through an encoded signal, said encoded signal being chosen from a unique spread spectrum frequency pattern and a sequence of 0's and 1's.

7. The telephone headset system of claim 1 wherein said remote, hands free call answering and call ending element includes at least function from the group consisting of flash, redial, call-waiting, # and *.

8. The telephone headset system of claim 7 wherein said remote call answering and call ending element comprising at least one actuator for call answering and call ending, and at least one actuator for additional functions.

9. A method of initiating call functions using a telephone headset system comprising a headset, a network interface device electronically in communication with a telecommunications network, a hands free call answering and call ending element comprising a foot switch actuator, the method comprising:
 receiving an indication of an incoming call;
 operating the hands free calling answering and call ending element to answer the call; and
 operating the hands free calling answering and call ending element to end the call.

10. The method of claim 9 further comprising operating the hands free calling answer and call ending element to initiate a function from the group consisting of flash, redial, call-waiting, # and *.

11. A telephone headset system for engaging in calls via a network interface device, the system comprising:
 a) a headset including a headphone and a microphone; and
 b) a remote, hands free call answering and call ending element comprising a foot switch actuator;

said network interface device, headset, and call answering and call ending element being electronically in communication.

12. The telephone headset system of claim 11 wherein said network interface device, said head set, and said remote call answering and call ending device are electrically in contact.

13. The telephone headset system of claim 11 wherein said network interface device is in wireless electronic communication at least one of said headset, and said remote call answering and call ending element.

14. The telephone headset system of claim 13 wherein said network interface device is in wireless electronic communication with both of said headset, and said remote call answering and call ending element.

15. The telephone headset system of claim 14 wherein said remote call answering and call ending element is in wireless connection with the network interface device through an encoded signal.

16. The telephone headset system of claim 15 wherein said remote call answering and call ending element is in wireless connection with the network interface device through an encoded signal, said encoded signal being chosen from a unique spread spectrum frequency pattern and a sequence of 0's and 1's.

17. The telephone headset system of claim 11 wherein said remote, hands free call answering and call ending element includes at least function from the group consisting of flash, redial, call-waiting, # and *.

18. The telephone headset system of claim 17 wherein said remote call answering and call ending element comprising at least one actuator for call answering and call ending, and-at least one actuator for additional functions.

* * * * *